United States Patent [19]

Sharma et al.

[11] Patent Number: 5,432,602
[45] Date of Patent: Jul. 11, 1995

[54] LIGHT WAVELENGTH MEASURING APPARATUS WITH LIGHT MODULATION

[75] Inventors: Manish Sharma; Hiroyuki Ibe, both of Yokohama, Japan

[73] Assignee: Kabushiki Kaisha Toshiba, Kawasaki, Japan

[21] Appl. No.: 211,717

[22] PCT Filed: Aug. 25, 1993

[86] PCT No.: PCT/JP93/01187

§ 371 Date: Apr. 25, 1994

§ 102(e) Date: Apr. 25, 1994

[87] PCT Pub. No.: WO94/04894

PCT Pub. Date: Mar. 3, 1994

[30] Foreign Application Priority Data

Aug. 25, 1992 [JP] Japan .................. 4-225819

[51] Int. Cl.⁶ .................................................. G01J 3/28
[52] U.S. Cl. ..................................... 356/326; 356/73.1
[58] Field of Search .................... 356/73.1, 303, 326

[56] References Cited

U.S. PATENT DOCUMENTS

| | | | |
|---|---|---|---|
| 4,551,019 | 11/1985 | Vella et al. | 356/73.1 |
| 4,984,884 | 1/1991 | Ryu et al. | 356/73.1 |
| 5,144,374 | 9/1992 | Grego | 356/326 |

FOREIGN PATENT DOCUMENTS

| | | |
|---|---|---|
| 0454124 | 10/1991 | European Pat. Off. . |
| 0033623 | 3/1980 | Japan . |
| 0105440 | 5/1986 | Japan . |
| 2168146 | 6/1986 | United Kingdom . |

OTHER PUBLICATIONS

Journal of Lightwave Technology, vol. 6, No. 10, Oct. 1988, Luc Thevenza, et al., "Group Delay Measurement In Single-Mode Fibers With True Picosecond Resolution Using Double Optical Modulation", pp. 1470–1475.

Patent Abstracts of Japan, vol. 6, No. 129 (P–128)(1007), Jul. 15, 1982, Jp-A-57 53643, Mar. 3, 1982.

Optics Communications, vol. 76, No. 5/6, May 15, 1990,, J. Vobian, "All-Fiber Spectrometer For The Determination Of The Emission Wavelengths Of Semiconductor Lasers", pp. 332–339.

Patent Abstracts Of Japan, vol. 13, No. 428 (P–936), Sep. 25, 1989, JP-A-01 161 124, Jun. 23, 1989.

Patent Abstracts Of Japan, vol. 12, No. 298 (P–744), Aug. 15, 1988, JP-A-63 071 624, Apr. 1,1988.

Patent Abstracts Of Japan, vol. 13, No. 454 (P–944), Oct. 13, 1989, JP-A-01 176 920, Jul. 13, 1989.

"High Accuracy and Ultra High Resolution MF9630A Optical Wavelength/Frequency Counter" Goto, H. et al; Anritsu Technical Bulletin, No. 62, Sep. 1991, pp. 38–43.

*Primary Examiner*—F. L. Evans
*Assistant Examiner*—Robert Kim
*Attorney, Agent, or Firm*—Oblon, Spivak, McClelland, Maier & Neustadt

[57] ABSTRACT

A small-sized, inexpensive light wavelength measuring apparatus which has no mechanical movable sections but which is capable of high-speed measurement and high measurement precision to improve in reliability. In the light wavelength measuring apparatus, the intensity of incoming light is modulated by a light modulator in response to a reference signal supplied from a signal source and the modulation light is provided with a delay corresponding to the wavelength thereof through a group delay dispersion medium. The light is then converted into an electrical signal by a photoelectric converter, and a phase difference between the electrical signal and reference signal is obtained by a phase comparator, thereby measuring the wavelength of the incoming light.

9 Claims, 5 Drawing Sheets

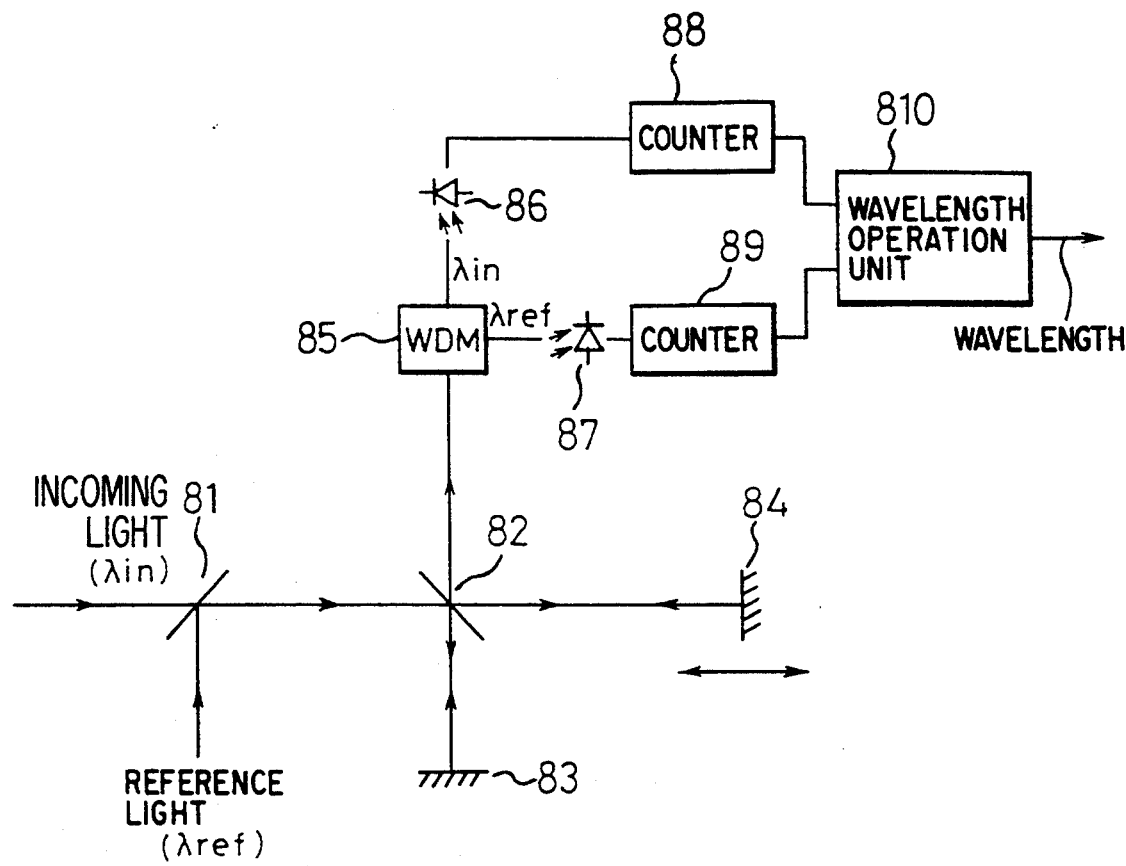
F I G. 1
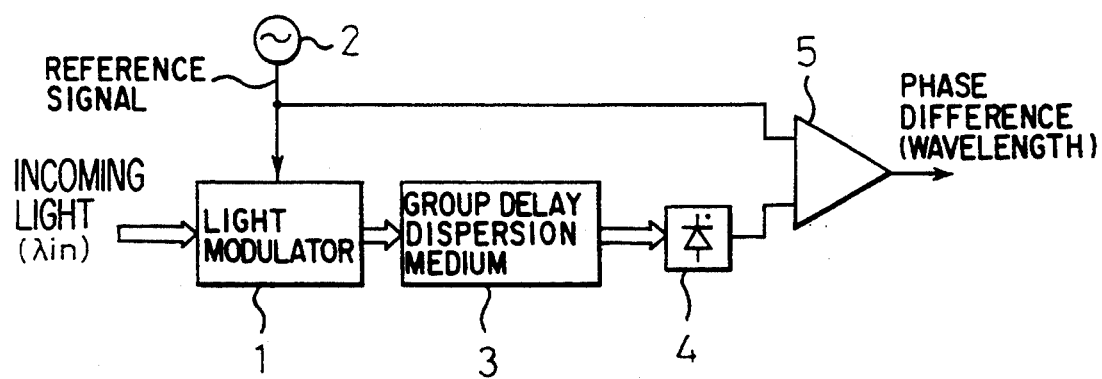
F I G. 2

LIGHT WAVELENGTH MEASURING APPARATUS WITH LIGHT MODULATION

FIELD OF THE INVENTION

This invention relates to a light wavelength measuring apparatus for use in an optical communication system, an apparatus for studying light, or the like.

DISCUSSION OF THE BACKGROUND

Most conventional light wavelength measuring apparatuses employ a Michelson interferometer. The basic constitution of a light wavelength measuring apparatus using the Michelson interferometer is shown in FIG. 1

In FIG. 1, the measured an incoming light I/P (wavelength: $\lambda$in) is mixed with reference light R/P (wavelength: $\lambda$ref) whose wavelength is considerably shorter than that of the measured light I/P by a first half mirror 81, and the mixed light is distributed to two systems by a second half mirror 82 of the Michelson interferometer.

The light of one of the systems is reflected by a fixed mirror 83 and then returned to the second half mirror 82. The light of the other system is incident upon a movable mirror 84. The movable mirror 84 periodically moves back and forth along the optical axis within a predetermined range. As a result, the light incident upon the movable mirror 83 is returned to the second half mirror 82 owing to the movement of the movable mirror.

The reflected light of the fixed mirror 83 and that of the movable mirror 84 are mixed with each other by the second half mirror 82, and the mixed light enters a WDM (Wavelength-Division Multiplexing) device 85 and is divided for each wavelength. The light of wavelength $\lambda$in and that of wavelength $\lambda$ref are converted into electrical signals by photoelectric converters (photodiodes) 86 and 87, respectively, and these signals are transmitted to counter circuits 88 and 89.

The counter circuits 88 and 89 detect the respective peak timings of the input signals to count peak timing signals of the light components during one cycle of movement of the movable mirror 84. The values counted by the counter circuits 88 and 89 are supplied to a wavelength calculation unit 810.

The wavelength calculation unit 810 calculates the number of peaks of wavelength interference patterns of the measured light and reference light on the basis of a ratio of the values of measured light components counted by the counter circuit 88 to those of reference light components counted by the counter circuit 89, thereby measuring the wavelength of the measured light based on the number of peaks.

Since, however, the above-described light wavelength measuring apparatus using the Michelson interferometer has a mechanical movable section for moving the mirror, the maximum measurement speed is restricted to about 10 times per second, and the movable section greatly influences the reliability of the apparatus. The maximum measurement speed and the reliability are particularly difficult conditions for optical communication systems requiring MTBF (Mean Time Between Failures) of several years.

Furthermore, since, in the foregoing light wavelength measuring apparatus, the wavelength of measured light is measured based on the number of peaks of wavelength interference patterns of the measured light and reference light, the wavelength of the reference light has to be stable and precise. This is also a very difficult condition, and the apparatus is forced to use a large-sized, expensive He-Ne (helium-neon) laser as a reference light source to achieve high wavelength stability. The apparatus is therefore increased in size and cost.

As described above, since the conventional light wavelength measuring apparatus has the mechanical movable section, the maximum measurement speed is restricted to remarkably low values, and the reliability of the apparatus deteriorates. Since, furthermore, the stability of wavelength is required for the reference light source, a large-sized, expensive laser has to be used, thereby increasing the size and cost of the whole apparatus.

SUMMARY OF THE INVENTION

The present invention has been developed in order to resolve the aforementioned problems, and its object is to provide a small-sized, inexpensive light wavelength measuring apparatus which has no mechanical movable sections but is capable of high-speed measurement and high measurement precision to improve in reliability.

A light wavelength measuring apparatus according to the present invention provides modulation light, which is generated by modulating the intensity of measured light in response to a reference signal, with a delay corresponding to the wavelength thereof through a group delay dispersion medium having wavelength dependence, converts the modulation light into an electrical signal, and calculates a difference in phase between the electrical signal and reference signal, thereby measuring the wavelength of the measured light.

BRIEF DESCRIPTION OF THE DRAWINGS

FIG. 1 is a block diagram showing a constitution of a conventional light wavelength measuring apparatus;

FIG. 2 is a block diagram showing a basic constitution of a light wavelength measuring apparatus according to an embodiment of the present invention;

DESCRIPTION OF THE PREFERRED EMBODIMENTS

Figure 3:
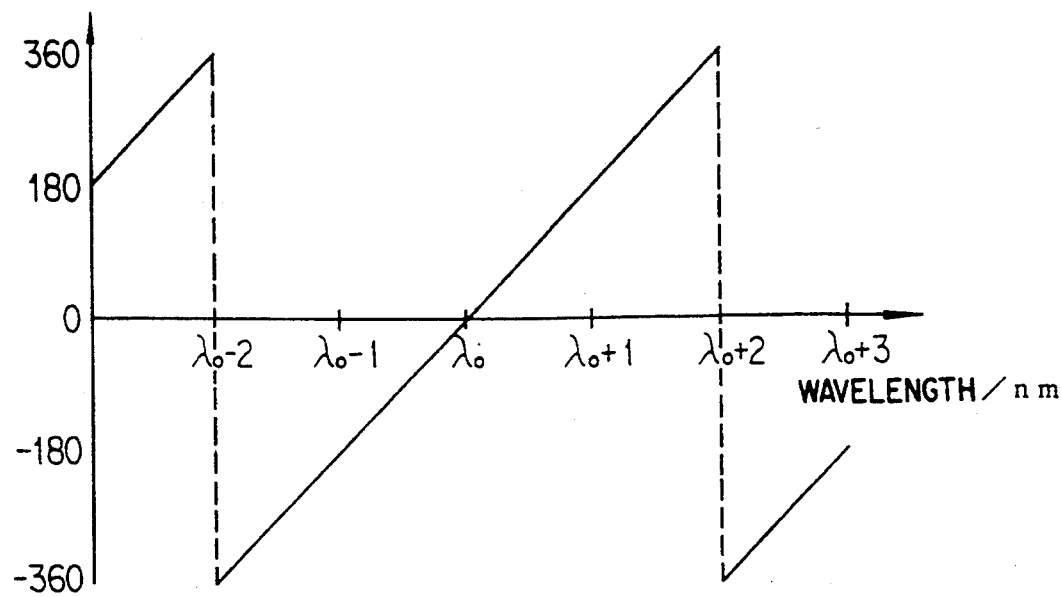
FIG. 3 is a graph showing wavelength versus phase detecting output characteristics of the apparatus of FIG. 2.

Embodiments of the present invention will now be described in detail, with reference to the accompanying drawings.

FIG. 2 shows a basic constitution of a light wavelength measuring apparatus according to the present invention. In FIG. 2, the incident light to be measured is sent to a light modulator 1. The light modulator 1 modulates the intensity of the incident light in response to a reference signal from a signal source 2, and the light whose intensity is modulated (hereinafter referred to as modulation light) enters a group delay dispersion medium 3.

For example, a single mode fiber of several kilometers having delay dispersion characteristics of a high dispersion medium is used for the group delay dispersion medium 3. The modulation light delayed by the group delay dispersion medium 3 is converted into an electrical signal by a photoelectric converter 4 such as a photodiode. The electrical signal is then supplied to a phase comparator 5 and its phase is detected in response to the reference signal from the signal source 2.

An operation of the light wavelength measuring apparatus having the above constitution will now be described.

First the intensity of measured light is modulated by the light modulator 1 in response to a reference signal. The light is then supplied to the photoelectric converter 4 through the group delay dispersion medium 3 and converted into an electrical signal therein. The electrical signal corresponds to variations in intensity of incident light, and its phase is detected by the phase comparator 5 in response to the reference signal. Group delay dispersion D (pF/nm) can be expressed as $D = -\Delta t/\Delta\lambda$, where $\Delta\lambda$ indicates variations in minute wavelength and $\Delta t$ denotes differences in group delay.

If, therefore, the group delay dispersion medium 3 has the group delay dispersion characteristics of D[ps/nm], and the wavelength of the measured light varies by $\Delta\lambda$, variations in phase of outgoing light of the medium 3, $\Delta$ phase is expressed as follows:

$$\Delta \text{ phase} = fm \cdot \Delta\lambda \cdot D \times 360/1000 \text{ [deg/nm]} \quad (1)$$

where fm [GHz] is the frequency of the reference signal.

As is apparent from equation (1), the phase detection output of the phase comparator 5 is proportionate to the variations in the wavelength of the measured light.

The wavelength versus phase detection output characteristics are shown in the graph of FIG. 3. As shown in FIG. 3, the phase detection output characteristics linearly change relative to the wavelength, and there are wavelengths $\lambda 0$ at which the phase detection output becomes zero. It is thus necessary to store the phase detection output characteristics in advance in the measuring apparatus in order to measure the wavelength of the light.

Since the phase can be measured only in the range of 360°, the wavelength measurement range (Range) is given by the following equation:

$$\text{Range} = 1000/(fm \cdot D)\text{[nm]} \quad (2)$$

Let us consider a case where a single mode fiber having dispersion of 20 [ps/n·km] at the wavelength of 1550 [nm] is used as the wavelength dispersion medium 3, and the frequency fm of the reference signal is 1 [GHz].

First the wavelength $\lambda 0$ corresponding to the phase detection output of zero is obtained. To obtain this wavelength, the light from the light source is caused to be incident upon the measuring apparatus, and the wavelength is changed at the light source so that the phase detection output of the measuring apparatus becomes zero. This relationship between them is stored in the measuring apparatus as wavelength versus phase detection output characteristics.

Since, in the above case, the total dispersion D of the group dispersion medium 3 amounts to 200 [ps/nm], when the wavelength of the measured light is changed by 1 [nm], the phase variation $\Delta$ phase of the outgoing light is given as follows:

$$\begin{aligned}\Delta \text{ phase} &= 1[\text{GHz}] \times 200[\text{ps/nm}] \times 360/1000[\text{deg}] \\ &= 72[\text{deg}]\end{aligned}$$

Therefore, the wavelength variation $\Delta\lambda$ per phase variation [deg] is 1/72 [nm] = 0.014[nm].

The wavelength of measured light can be calculated by adding a precalculated value $\lambda 0$ of the wavelength to a value of wavelength variation $\Delta\lambda$ into which a phase detection output is converted.

Since, in this case, the apparatus has no mechanical movable section, it is able to measure the wavelength of light in real time, with high precision, and at high speed. Furthermore, since the apparatus does not require any reference light, it need not employ a large-sized and expensive laser, resulting in a decrease in size and cost.

In the above embodiment, since the range of the detected phase is 360°, the measured wavelength is restricted to 5 [nm]. This restriction can be relaxed by reducing the modulation frequency fm or decreasing the total dispersion D by shortening the group delay dispersion medium 3.

The light wavelength measuring apparatus having the above constitution is required to compensate for a drift due to variations in temperature. In other words, even though temperature varies small and randomly, the length, refractive index, and amount of delay in transmission of a fiber or the like used for the dispersion medium 3, will vary widely. This problem is clearly fatal to this wavelength measuring system.

Figure 4:
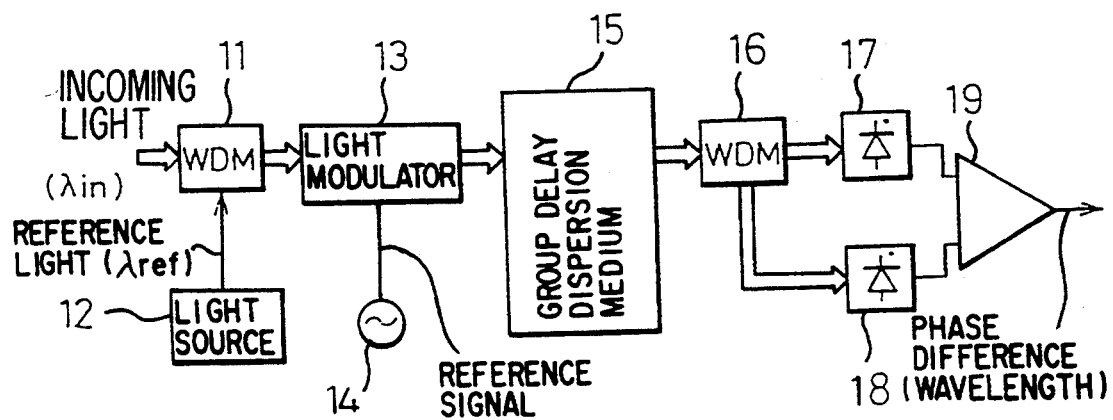
FIG. 4 is a block diagram showing a constitution of a light wavelength measuring apparatus according to another embodiment of the present invention, which employs reference light.

The use of reference light can be considered as one method for resolving the above problem. FIG. 4 shows a constitution of a light wavelength measuring apparatus employing the reference light.

Referring to FIG. 4, the incident light (wavelength: $\lambda$in) to be measured is multiplexed in a WDM coupler 11 with reference light (wavelength: $\lambda$ref) emitted from a light source 12, and the intensity of the multiplexed light is modulated in a light modulator 13 in response to a reference signal supplied from a signal source 14. A common semiconductor laser can be employed as the light source 12.

The modulation light emitted from the light modulator 13 undergoes group delay dispersion in a group delay dispersion medium 15, and is divided into light signals of wavelengths $\lambda$in and $\lambda$ref in a WDM coupler 16. These light signals are converted into electrical signals in photoelectric converters 17 and 18, respectively, and the signals are then supplied to a phase comparator 19 and their phases are detected.

In the light wavelength measuring apparatus having the above constitution, the measured light and reference light are detected through the same group dispersion medium 15. Thus both the detection signals are influenced by whatever characteristic variations occurring in the dispersion medium 15 owing to variations in temperature or the like. If, therefore, a difference in phase between the detection signals is detected by a phase comparator 19, the wavelength λin of the light can be measured with high precision.

The influence due to variations in temperature directly influences the precision in wavelength of reference light. Unlike the conventional apparatus, an He-Ne laser having high wavelength stability need not be used as a light source and, if the wavelength λref of the reference light is set to the minimum dispersion wavelength of the dispersion medium 15 (1310 [nm] in a fiber used in an optical communication line), the influence of variations in wavelength can be suppressed to a negligible extent to allow the use of a common semiconductor laser.

The object to be considered in the apparatus having the foregoing constitution is to secure sufficient isolation between the incident light and reference light when they are separated from each other. When the intensity of light is modulated by, for example, a sine wave, the isolation between them is required in the order of 30 [dB]. In order to secure the isolation over a broad optical bandwidth, an optical filter is needed. Using such a filter, isolation of wavelength of at least 100 [nm] is required between the incident light and reference light.

Figure 5:
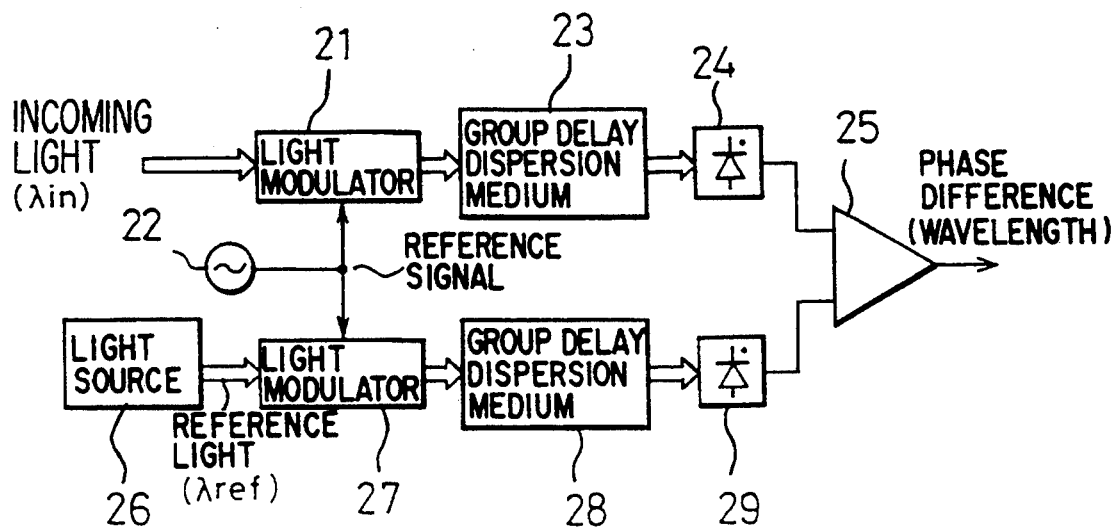
FIG. 5 is a block diagram showing a constitution of a light wavelength measuring apparatus according to another embodiment of the present invention, which does not multiplex reference light.

Not multiplexing incident light and reference light can be considered as one method for attaining the above object. FIG. 5 shows a constitution of a light wavelength measuring apparatus which does not multiplex the light signals with each other.

In FIG. 5, the intensity of incident light (wavelength: λin) to be measured is modulated in a light modulator 21 in response to a reference signal supplied from a signal source 22, and transmitted to a photoelectric converter 24 via a group delay dispersion medium 23. The light is converted into an electrical signal by the photoelectric converter 24, and the electrical signal is then supplied to a phase comparator 25. The intensity of reference light from a light source 26 is also modulated in a light modulator 27 in response to a reference signal supplied from the signal source 22, and transmitted to a photoelectric converter 29 via a group delay dispersion medium 28. The light is converted into an electrical signal by the photoelectric converter 29, and the electrical signal is then supplied to the phase comparator 25.

The group delay dispersion mediums 23 and 28 are arranged under the same circumstances and to be as physically close as possible to each other to make their characteristic variations due to temperature variations almost equal to each other. According to this arrangement, the incident light and reference light are not multiplexed with or separated from each other, so that the wavelength of the incident light can be measured correctly from a phase difference between them obtained from the phase comparator 25, without taking into consideration any isolation.

However, the apparatus shown in FIG. 5 necessitates separate light modulators for the measured light and reference light in addition to the light source for the reference light, resulting in complicating the constitution of the apparatus and increasing the size of the entire apparatus.

Figure 6:
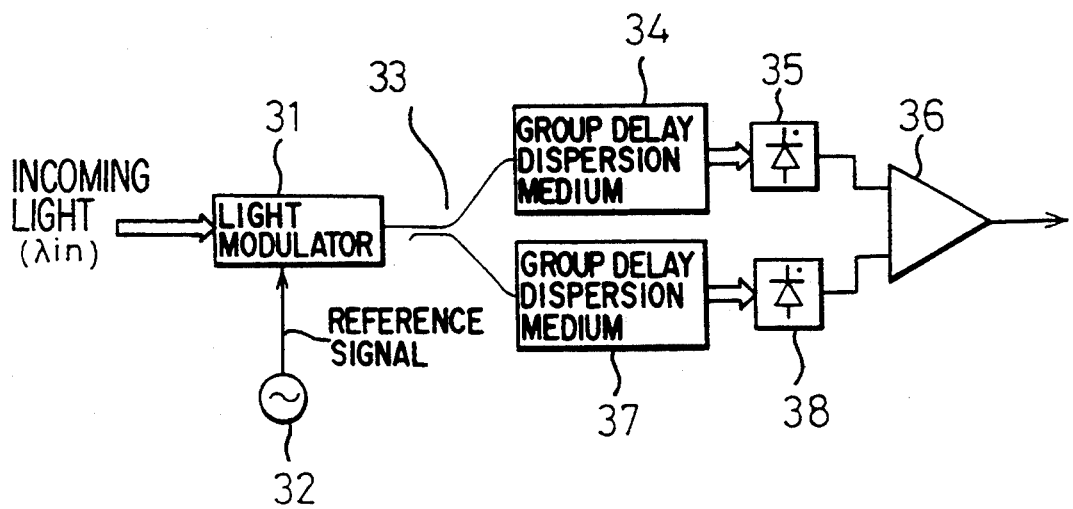
FIG. 6 is a block diagram showing a constitution of a light wavelength measuring apparatus according to still another embodiment of the present invention, which uses two group delay dispersion mediums of different wavelength dependencies.

As one method for eliminating the above drawback, a group delay dispersion medium free of wavelength dependence can be used. FIG. 6 shows a constitution of a light wavelength measuring apparatus having such group delay dispersion mediums.

In FIG. 6, the intensity of incident light (wavelength: λin) to be measured, is modulated in a light modulator 31 in response to a reference signal supplied from a signal source 32, and the modulation light is distributed to first and second systems in a WDM coupler 33.

The modulation light distributed to the first system is provided with a delay corresponding to the wavelength thereof by a group delay dispersion medium 34 having wavelength dependence, and converted into an electrical signal in a photoelectric converter 35. The electrical signal is then supplied to a phase comparator 36. The modulation light distributed to the second system is provided a fixed delay by a group delay dispersion medium 37 free of wavelength dependence, and converted into an electrical signal. The electrical signal is then supplied to the phase comparator 36.

For example, a single mode fiber of several kilometers having delay dispersion characteristics of a high dispersion medium is used as the group delay dispersion medium 34 of the first system at a linear portion of the delay dispersion characteristics in the wave band of transmission light. Further, a fiber having the same size and the same structure as that of the fiber used for the medium 34, is used as the group delay dispersion medium 37 of the second system in the vicinity of a zero dispersion point of the delay dispersion characteristics in the wave band of transmission light. These mediums 34 and 37 are arranged close to each other under the same circumstances.

In the light wavelength measuring apparatus having the above-described constitution, if a fixed delay is given to the measured light whose intensity is modulated through the group delay dispersion medium 37 of the second system having no wavelength dependence, the delayed light can be regarded as reference light. Since, in this case, both the mediums 34 and 36 have the same size and the same structure and are disposed under the same circumstances, their characteristics variations due to variations in temperature are the same.

Therefore, the apparatus having the constitution shown in FIG. 6 is capable of generating the same dispersion output as the group delay dispersion output of the reference light of the second system shown in FIG. 5, without using a light source for the reference light or a modulator for modulating the reference light. Calculating a difference in phase between the modulation lights of both the systems by the phase comparator 36, the wavelength of the light can be measured correctly.

Figure 7:
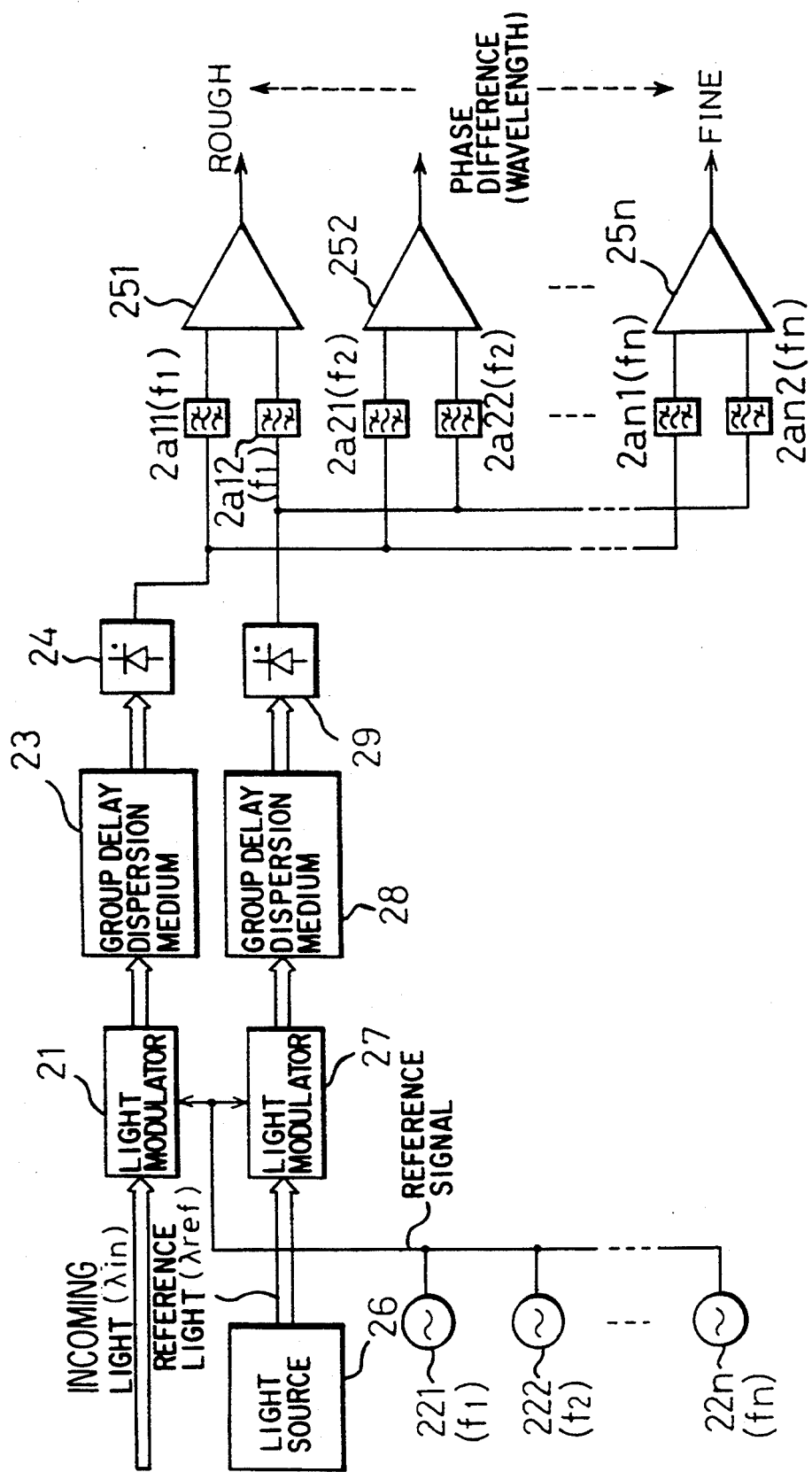
FIG. 7 is a block diagram showing a constitution of a light wavelength measuring apparatus according to still another embodiment of the present invention, which uses a plurality of modulation frequencies.

In the embodiments described above, the measurement range is restricted, and the measurement resolution cannot be increased too much. As one method for eliminating this drawback, the modulation frequency can be multiplexed. FIG. 7 shows a constitution of a light wavelength measuring apparatus which multiplexes the modulation frequency. In FIG. 7, the same components as those of FIG. 2 are denoted by the same reference numerals, and their descriptions are omitted.

In FIG. 7, signal sources 221 to 22n generate sine wave signals of different frequencies f1 to fn, where $f_1 < f_2 < \ldots < f_n$. The frequency signals generated from the respective signal sources 221 to 22n are multiplexed.

The multiplexed signals are transmitted to a light modulator 21 for measured light and a light modulator 27 for reference light, and the intensity of each incident light is modulated.

The output signals of photoelectric converters 24 and 29 are distributed to n systems. These systems have respective phase comparators 251 to 25n to which the output frequency components of the signal sources 221 to 22n are supplied through their corresponding bandpass filters 2a11, 2a12, 2a21, 2a22, ..., 2an1, 2an2.

In the light wavelength measuring apparatus having the above constitution shown in FIG. 7, the n-system reference signals having different frequencies are multiplexed, and the intensity of measured light is modulated. After group delay dispersion and photoelectric conversion, the modulation light is divided into signals of n systems, and their phases are detected for each frequency of reference signal. As is apparent from the equation (2), the frequency of the reference signal increases/decreases in proportion to the width of the wavelength measurement range. The phase of a reference signal of low frequency allows the wavelength measurement to be performed over a wide range of poor resolution. If, however, the frequency of the reference signal is increased, higher resolution can be obtained but only over a narrow wavelength range, as is apparent from the equation (1). Consequently, a combination of both high and low reference signals can be used to simultaneously obtain high resolution and a wide wavelength measurement range.

Figure 8:
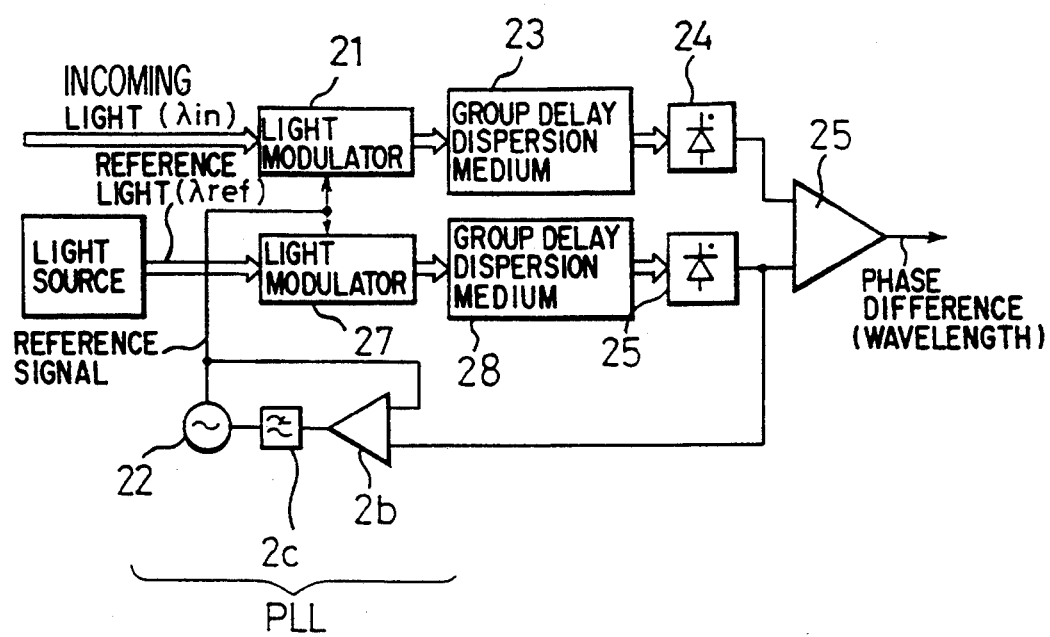
FIG. 8 is a block diagram showing a constitution of a light wavelength measuring apparatus according to yet another embodiment of the present invention, which employs a PLL circuit.

A PLL (Phase-Locked Loop) circuit can be employed, in place of the constitution shown in FIG. 6, as a method for compensating for variations in phase which are caused by variations in fiber length of a group delay dispersion medium due to variations in temperature. FIG. 8 shows a constitution of a light wavelength measuring apparatus having the PLL circuit. In FIG. 8, the same components as those of FIG. 5 are indicated by the same reference numerals, and their descriptions are omitted.

Referring to FIG. 8, a VCO (Voltage-Controlled Oscillator) is used for the signal source 22, and its oscillation outputs are supplied to light modulators 21 and 27 and a phase comparator 2b as reference signals. The phase comparator 2b receives a photoelectrically converted output of reference light as well as the output of the signal source 22, and transmits a difference in phase between them. The output of the phase comparator 2b is converted into an electrical signal by a low-pass filter 2c, and the signal is sent to the signal source (VCO) 22 as a frequency control signal.

In the light wavelength measuring apparatus having the above constitution shown in FIG. 8, the oscillation frequency of the signal source 22 is so controlled that the phase variations are fixed on the reference light side. It is thus possible to compensate for phase variations caused by variations in fiber lengths of group delay dispersion mediums 23 and 28 due to variations in temperature.

Figure 9:
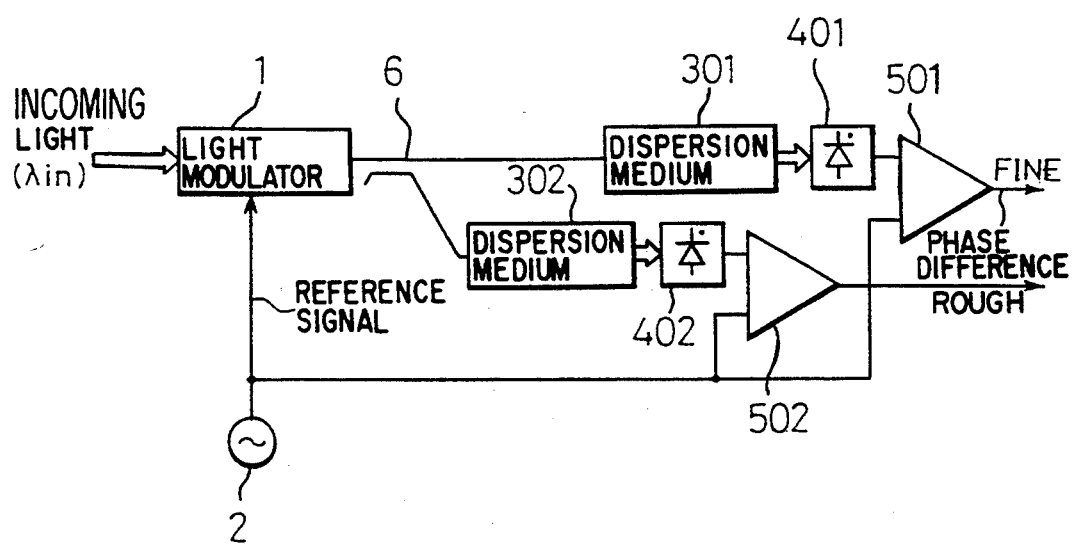
FIG. 9 is a block diagram showing a constitution of a light wavelength measuring apparatus according to yet another embodiment of the present invention, which employs group delay dispersion mediums having different lengths.

As a method for extending the wavelength measurement range, group delay dispersion mediums having different lengths can be used. FIG. 9 shows a constitution of a light wavelength measuring apparatus using such group delay dispersion mediums. In FIG. 9, the same components as those of FIG. 2 are denoted by the same reference numerals, and their descriptions are omitted.

In FIG. 9, the measured light whose intensity is modulated by a light modulator 1, that is, the modulation light, is distributed to a plurality of systems (two systems in FIG. 9) by a directional coupler 6. The modulation light of one of the systems (first system) goes through a relatively longer group delay dispersion medium 301 and converted into an electrical signal by a photoelectric converter 401. The electrical signal is then supplied to a phase comparator 501, together with a reference signal. The modulation of the other system (second system) goes through a relatively shorter group delay dispersion medium 302 and converted into an electrical signal by a photoelectric converter 402. This signal is supplied to a phase comparator 502, together with a reference signal.

In the light wavelength measuring apparatus having the above constitution shown in FIG. 9, the modulation light signals go through the group delay dispersion mediums 301 and 302 of different lengths, and phase variations are obtained from the phase comparators 501 and 502 based on the reference signals. If the lengths of the group delay dispersion mediums vary, the phase variations are increased or decreased in proportion to the phase variations, as is apparent from the equation (1). Using the longer medium 301, the wavelength of light can be measured with high resolution.

As is evident from the equation (2), however, if the medium is lengthened, the wavelength measurement range is narrowed in inverse proportion to the length of the medium. Consequently, a system of phase detection output has only to be selected so as to satisfactorily keep a balance between the wavelength measurement range and resolution.

This invention is not limited to the above embodiments. Various changes and modifications can be made without departing from the scope of the subject matter of the present invention.

As described above, the light wavelength measuring apparatus according to the present invention, which has no mechanical movable components, increases in measurement speed and measurement precision to improve in reliability, and is useful as a small-sized, inexpensive apparatus.

We claim:

1. A light wavelength measuring apparatus comprising:

a light source for emitting reference light of a specific wavelength;

a signal source for generating a reference signal of a fixed frequency;

light multiplexing means for multiplexing the wavelength of the reference light emitted from said light source and a wavelength of incoming light which is to be measured;

a light modulator for modulating the intensity of the light multiplexed by said light multiplexing means, in response to the reference signal generated from said signal source;

a group delay dispersion medium for providing the light whose intensity is modulated by said light modulator with a wavelength, dependent delay with zero group delay dispersion at the wavelength of the reference light;

light dividing means for dividing output light of said group delay dispersion medium into light signals of different wavelengths;

a photoelectric converter for converting the light signals obtained from said light dividing means into electrical signals; and a phase comparator for obtaining a phase difference between the electrical signals generated from said photoelectric converter, whereby a wavelength of the incoming light is measured based on the phase difference obtained from said phase comparator.

2. The light wavelength measuring apparatus according to claim 1, wherein said light source is a semiconductor laser.

3. A light wavelength measuring apparatus comprising:

a signal source for generating a reference signal of a fixed frequency;

a first light modulator for modulating an intensity of an incoming light in response to the reference signal generated from said signal source;

a first group delay dispersion medium for providing output light of said first light modulator with a delay corresponding to a wavelength of the output light;

a first photoelectric converter for converting output light of said group delay dispersion medium into an electrical signal;

a light source for emitting reference light of a specific wavelength;

a second light modulator for modulating an intensity of the reference light emitted from said light source in response to the reference signal generated from said signal source;

a second group delay dispersion medium, which is equal in size and structure to said first group delay dispersion medium and which is located near said first group delay dispersion medium under same environmental conditions, for providing output light of said second light modulator with a wavelength-dependent delay with zero group delay dispersion at the wavelength of the reference light, a second photoelectric converter for converting output light of said second group delay dispersion medium into an electrical signal; and a phase comparator for obtaining a phase difference between the output signal of said first photoelectric converter and the output signal of said second photoelectric converter, whereby a wavelength of the incoming light is measured based on the phase difference obtained from said phase comparator.

4. The light wavelength measuring apparatus according to claim 3, wherein said light source is a semiconductor laser.

5. The light wavelength measuring apparatus according to claim 3, wherein said signal source includes an oscillator for varying the difference in response to a control signal, a phase comparator for comparing a phase of an output of said signal source and a phase of an output of said second photoelectric converter, and signal converting means for converting an output of said phase comparator into a control signal and supplying the control signal to the oscillator.

6. A light wavelength measuring apparatus comprising:

a signal source for generating a reference signal of a fixed frequency;

a light modulator for modulating an intensity of an incoming light in response to the reference signal generated from said signal source;

light distributing means for distributing output light of said light modulator to first and second systems;

a first group delay dispersion medium for providing light of the first system with a delay corresponding to a wavelength of the light;

a first photoelectric converter for converting output light of said first group delay dispersion medium into an electrical signal;

a second group delay dispersion medium, which is equal in size and structure to said first group delay dispersion medium, which is disposed near said first group delay dispersion medium under same circumstances, and whose group delay dispersion characteristics become zero in a wave band of transmission light, for providing light of the second system with a wavelength-dependent delay with zero group delay dispersion at the wavelength of the reference light;

a second photoelectric converter for converting output light of said second group delay dispersion medium into an electrical signal; and a phase comparator for obtaining a phase difference between the output signal of said first photoelectric converter and the output signal of said second photoelectric converter, whereby a wavelength of the incoming light is measured based on the phase difference obtained from said phase comparator.

7. A light wavelength measuring apparatus comprising:

a plurality of signal sources for generating signals of different fixed frequencies;

multiplexing means for multiplexing respective signals output from said plurality of signal sources;

a first light modulator for modulating an intensity of an incoming light in response to multiplexed signals obtained from said multiplexing means;

a first group delay dispersion medium for providing output light of said first light modulator with a delay corresponding to the output light;

a first photoelectric converter for converting output light of said first group delay dispersion medium into an electrical signal;

a light source for emitting reference light of a specific wavelength;

a second light modulator for modulating the intensity of the reference light emitted from said light source in response to the multiplexed signals;

a second group delay dispersion medium, which are equal in size and structure to said first group delay dispersion medium and which is located near said first group delay dispersion medium under same circumstances, for providing output light of said second light modulator with a delay corresponding to a wavelength of the output light;

a second photoelectric converter for converting output light of said second group delay dispersion medium into an electrical signal;

light distributing means for distributing output signals of said first and second photoelectric converters to a plurality of systems;

a plurality of bandpass filters for filtering out each of the frequency components having frequencies identical to those of said plurality of signal sources corresponding to distributed signals of said light distributing means pass; and a plurality of phase comparators each for obtaining a phase difference between outputs of said bandpass filters for each of the systems, whereby a wavelength of the incoming light is measured based on the phase differences obtained from said plurality of phase comparators.

8. A light wavelength measuring apparatus comprising:

a signal source for generating a reference signal of a fixed frequency;

a light modulator for modulating an intensity of an incoming light in response to the reference signal generated from said signal source;

light distributing means for distributing output light of said light modulator to a plurality of systems;

a plurality of group delay dispersion mediums, which are arranged in the plurality of systems of said light distributing means, respectively, for providing incident lights with delays corresponding to different wavelengths of the incident lights;

a plurality of photoelectric converters for converting output lights of said plurality of group delay dispersion mediums into electrical signals; and a plurality of phase comparators each for obtaining a phase difference between each output signal of said plurality of photoelectric converters and the reference signal output from said signal source, whereby a wavelength of the an incoming light is measured based on the phase differences obtained from said plurality of phase comparators.

9. A light wavelength measuring apparatus comprising:

a plurality of signal sources for generating signals of different fixed frequencies;

a light multiplying means for multiplying light from a reference light source with an incoming light whose wavelength is to be measured;

a light modulator for modulating an intensity of the incoming light in response to multiplexed signals obtained from said multiplexing means;

a group delay dispersion medium for providing output light of said light modulator with a delay corresponding to the output light;

a first photoelectric converter for converting output light of said group delay dispersion medium into an electric signal;

a light source for emitting reference light of a specific wavelength;

a light dividing means for dividing output light of said group delay dispersion medium into light components of different wavelengths;

a second photoelectric converter for converting output light of said light dividing means;

light distributing means for distributing output signals of said first and second photoelectric converters to a plurality of systems;

a plurality of bandpass filters for filtering out each of the frequency components having frequencies identical to those of said plurality of signal sources corresponding to distributed signals of said light distributing means; and a plurality of phase comparators each for obtaining a phase difference between outputs of said bandpass filters from each of the systems, whereby a wavelength of the incoming light is measured based on the phase difference obtained from said plurality of phase comparators.

* * * * *